March 1, 1927.

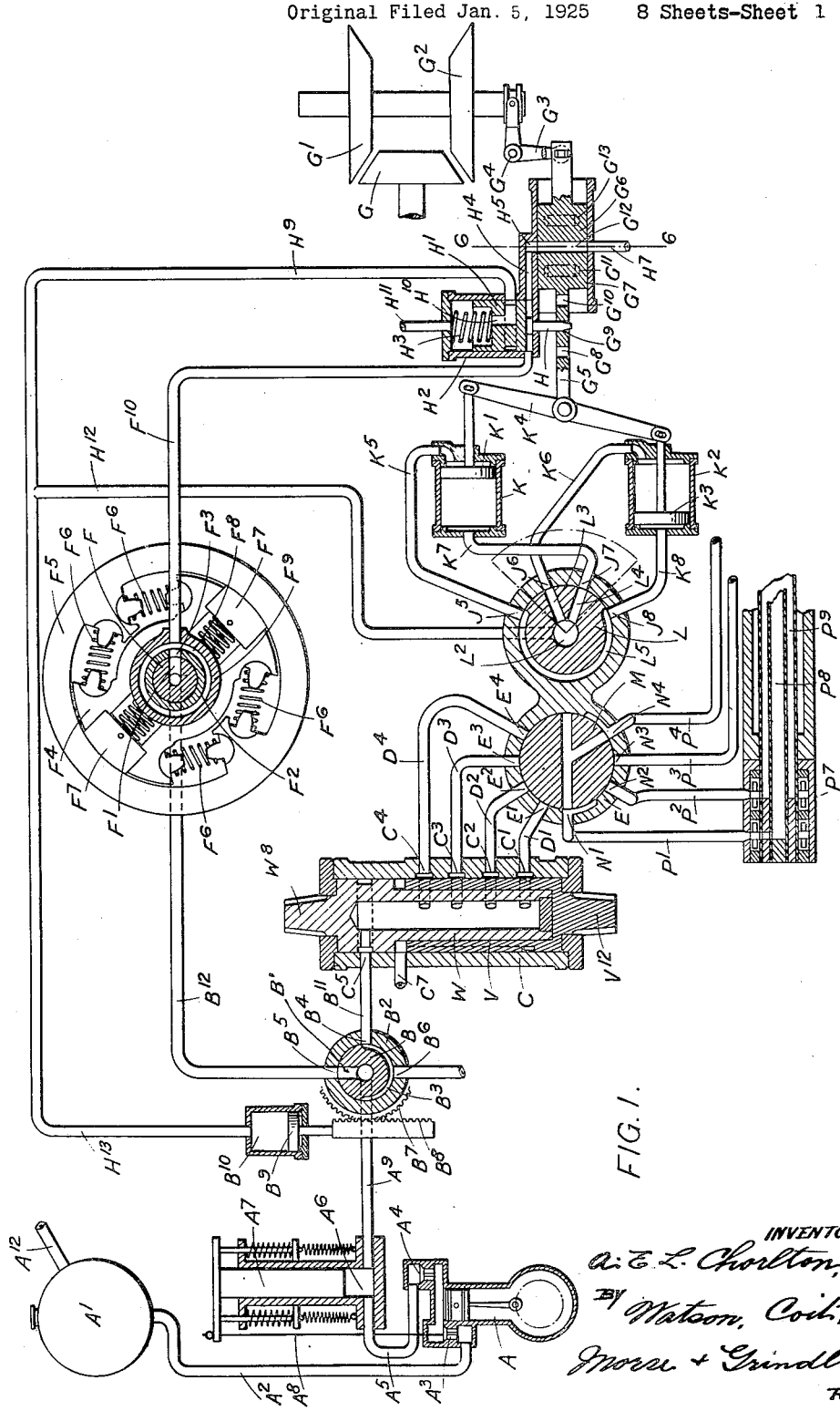

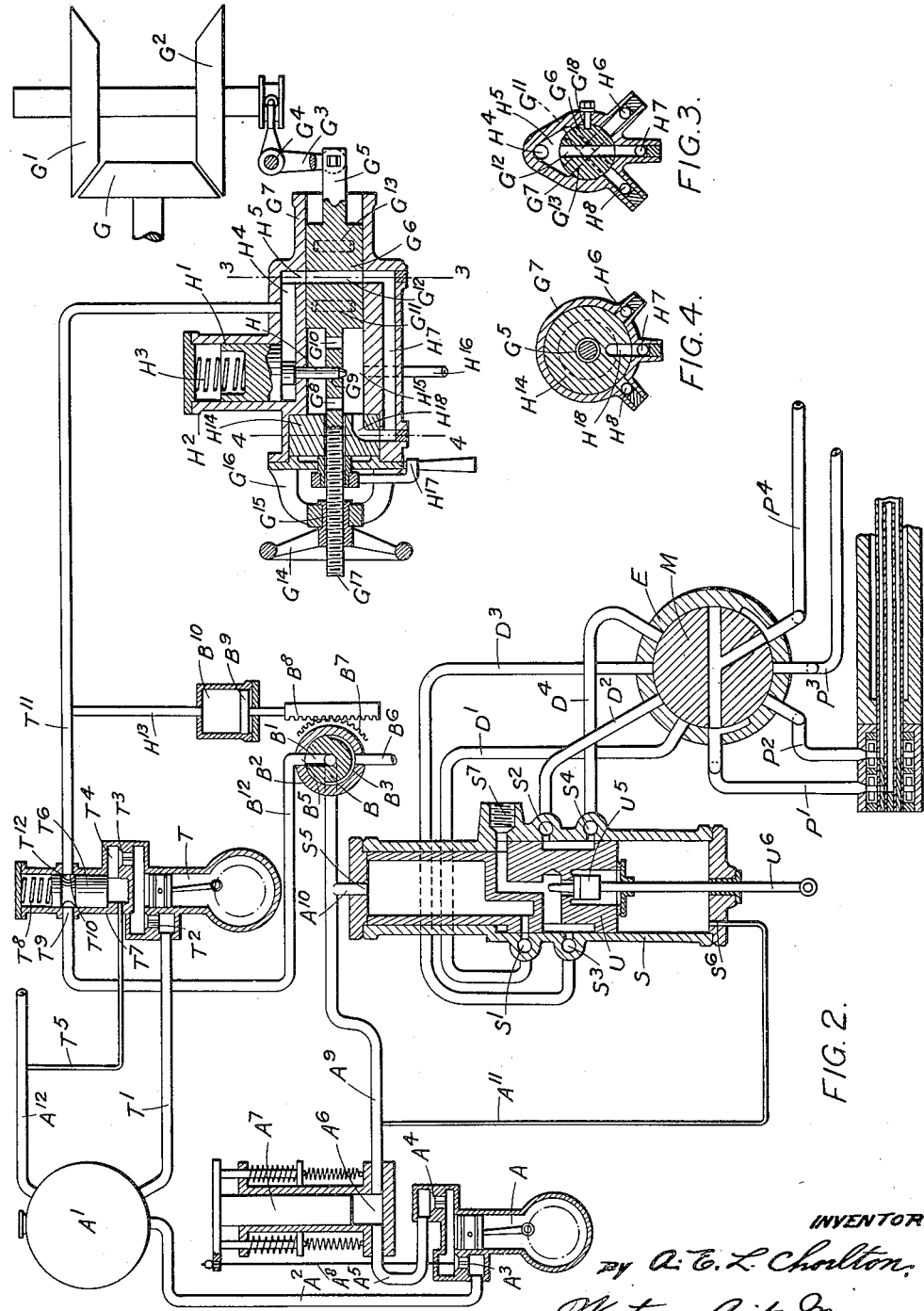

A. E. L. CHORLTON 1,619,704

INTERNAL COMBUSTION ENGINE LOCOMOTIVE

Original Filed Jan. 5, 1925  8 Sheets-Sheet 4

INVENTOR
By A. E. L. Chorlton,
Watson, Coit, Morse + Grindle
ATTYS.

March 1, 1927.
A. E. L. CHORLTON
1,619,704
INTERNAL COMBUSTION ENGINE LOCOMOTIVE
Original Filed Jan. 5, 1925    8 Sheets-Sheet 5

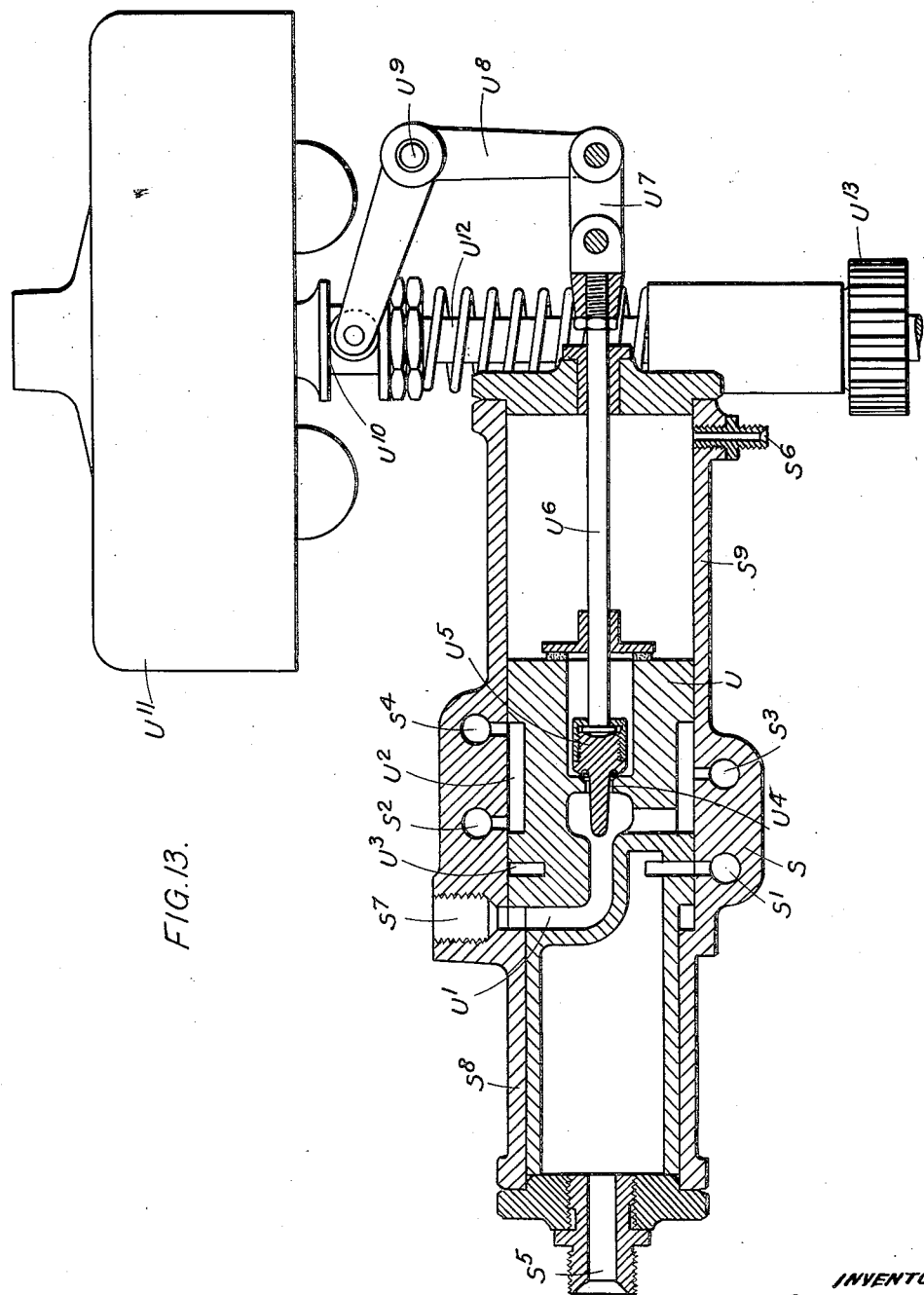

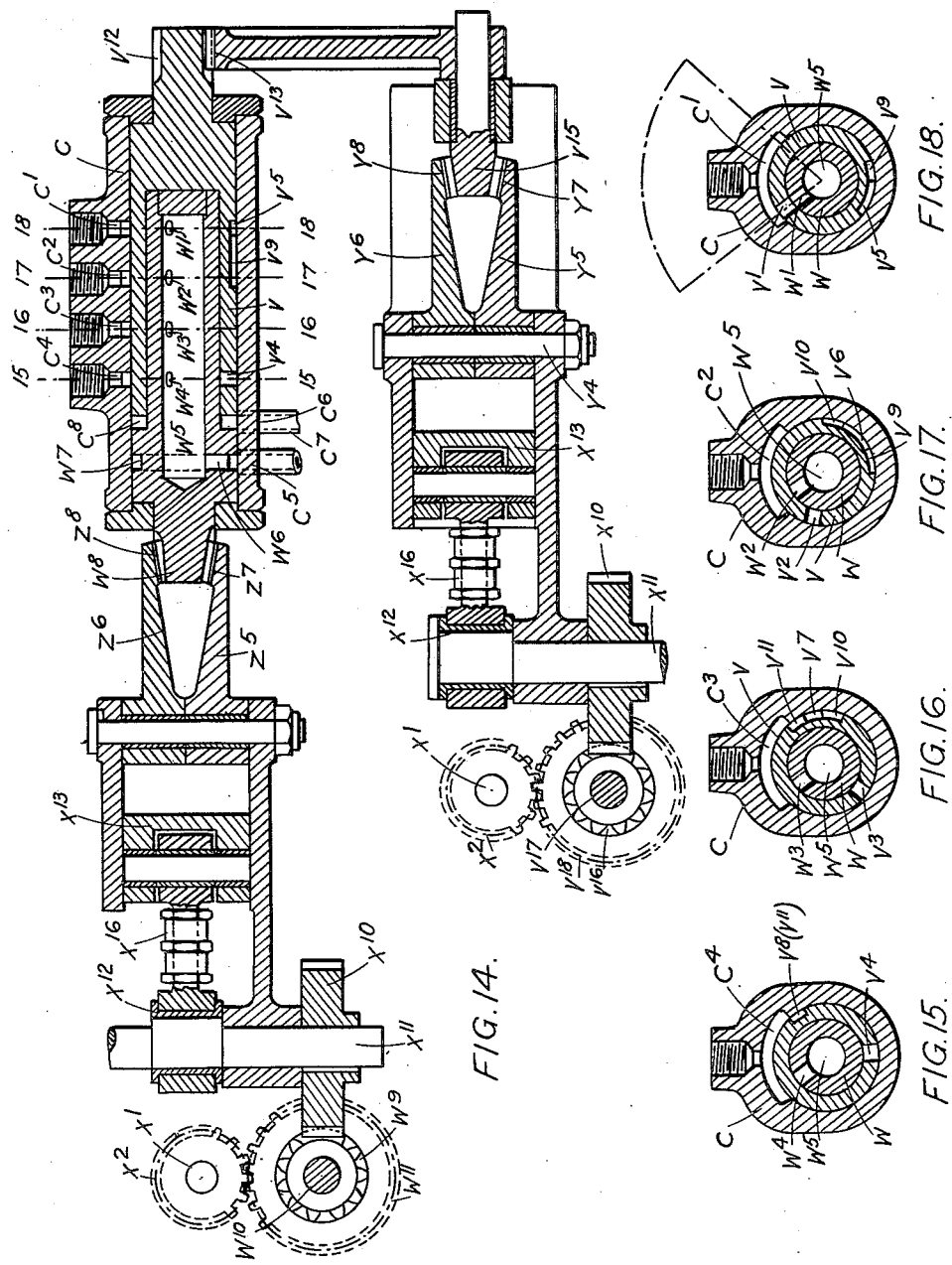

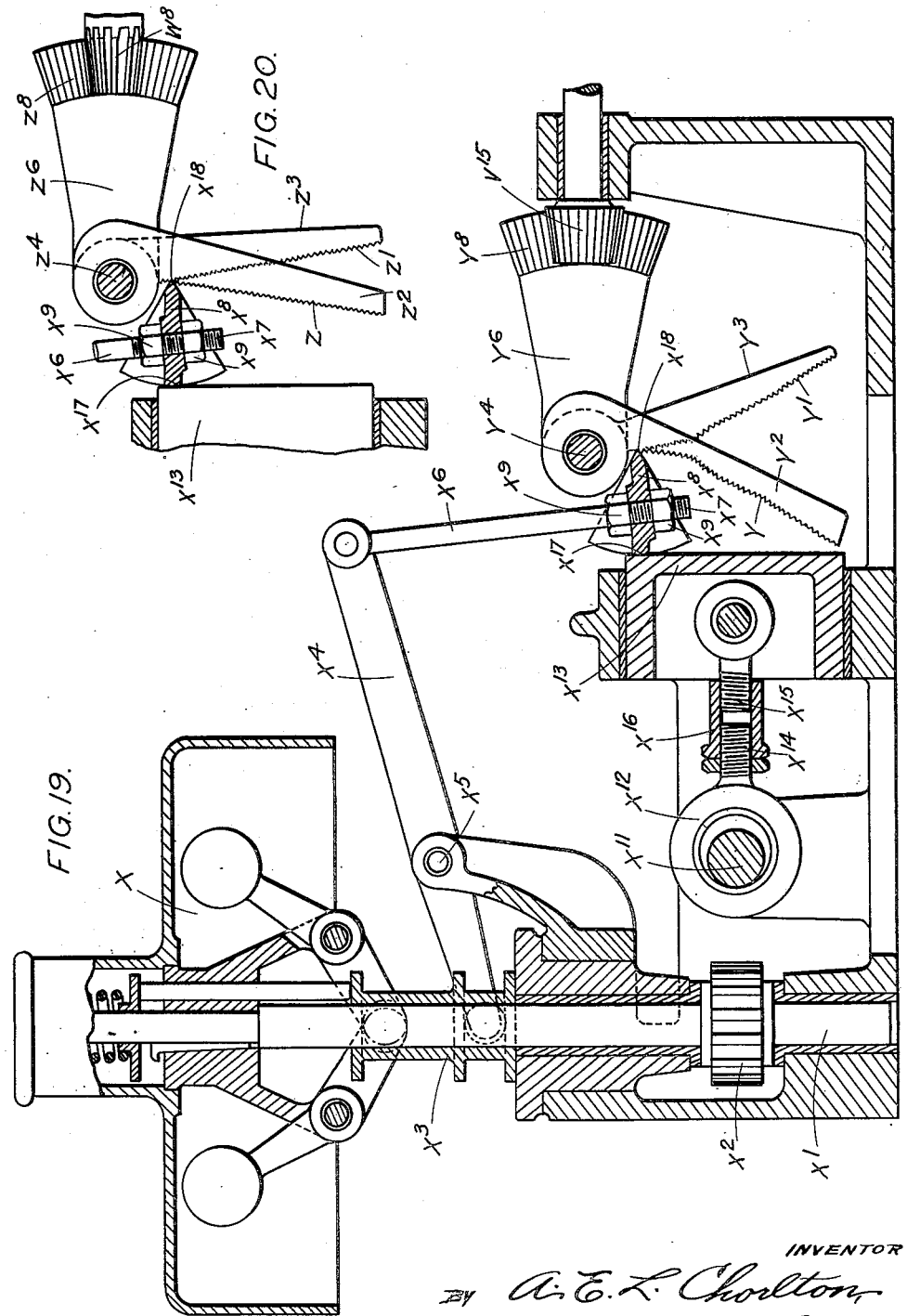

Patented Mar. 1, 1927.

1,619,704

UNITED STATES PATENT OFFICE.

ALAN ERNEST LEOFRIC CHORLTON, OF LONDON, ENGLAND, ASSIGNOR OF ONE-HALF TO WILLIAM BEARDMORE, OF LONDON, ENGLAND.

INTERNAL-COMBUSTION-ENGINE LOCOMOTIVE.

Application filed January 5, 1925, Serial No. 657, and in Canada November 29, 1923. Renewed January 15, 1927.

This invention relates to internal combustion engine locomotives and although not limited thereto is more particularly applicable to locomotives for road or rail in which power is transmitted from an internal combustion engine of the heavy oil type through an epicyclic variable speed gear controlled by plate clutches and a bevel reversing mechanism to a series of coupled track wheels.

The primary object of the invention is to provide an efficient fluid pressure system for controlling the transmission mechanism, so as to minimize the risk of damage to the parts of the locomotive.

More specific objects of the invention are to prevent damage resulting from:—

(1) Varying the gear ratio of the variable speed gear at a time when the road speed of the locomotive is not suited to such change;

(2) Putting the locomotive into gear when the reversing mechanism is not in condition therefor;

(3) Operating the reversing mechanism while the locomotive is in gear or when the locomotive is in motion;

(4) Releasing the brakes whilst the reversing mechanism is being operated.

Further objects of the invention will be apparent from the following description of the accompanying drawings and from the appended claims.

Figure 5:
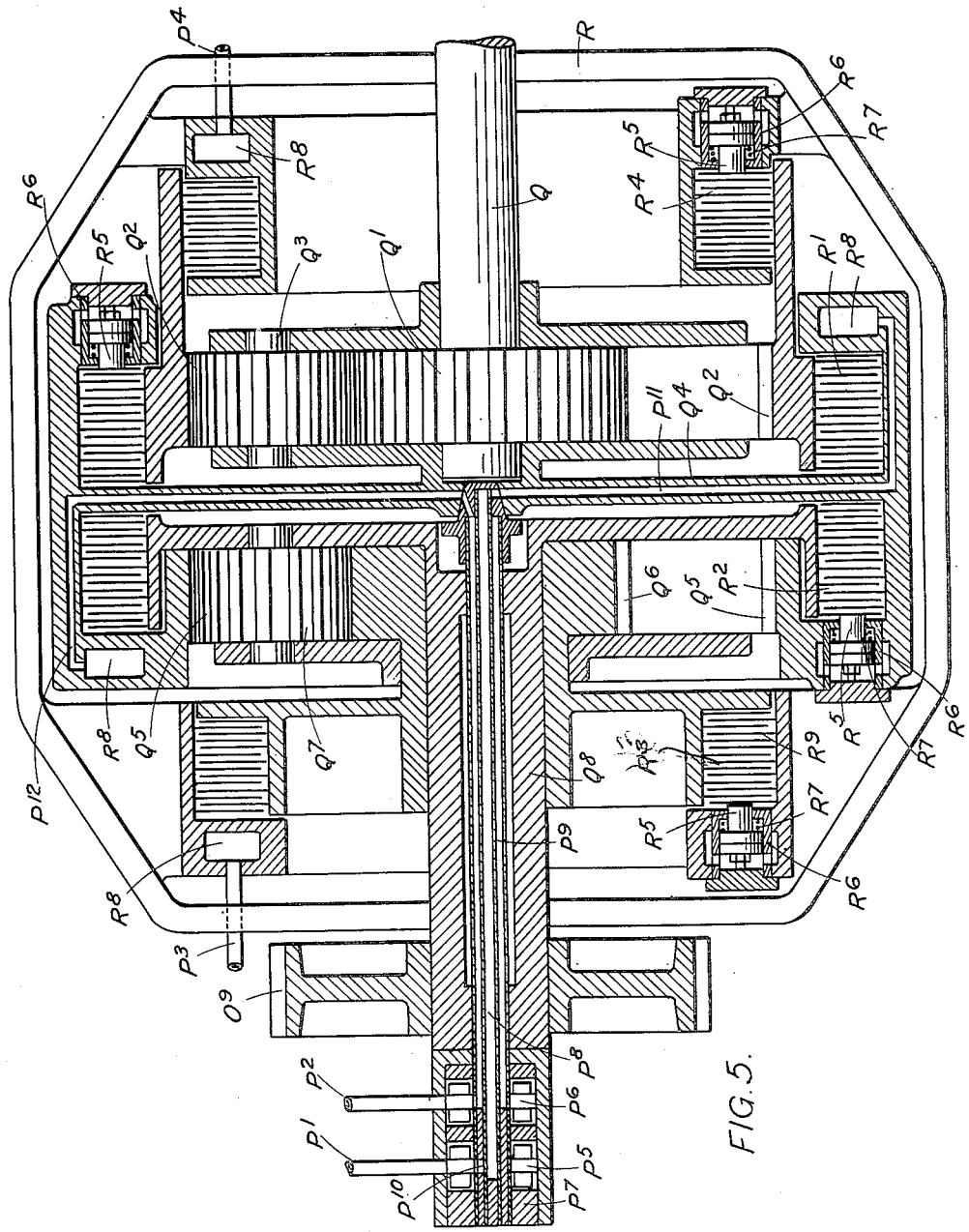
Figure 6:
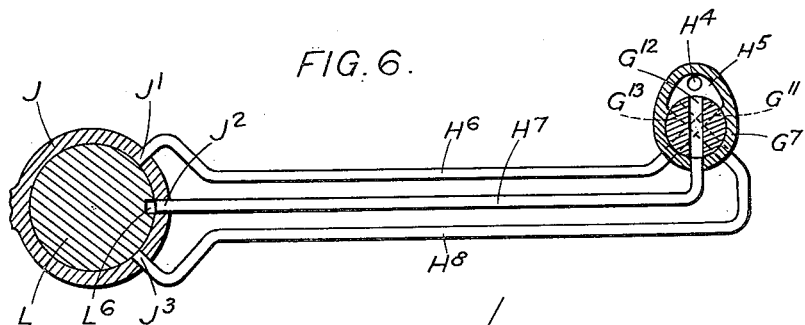
Figure 7:
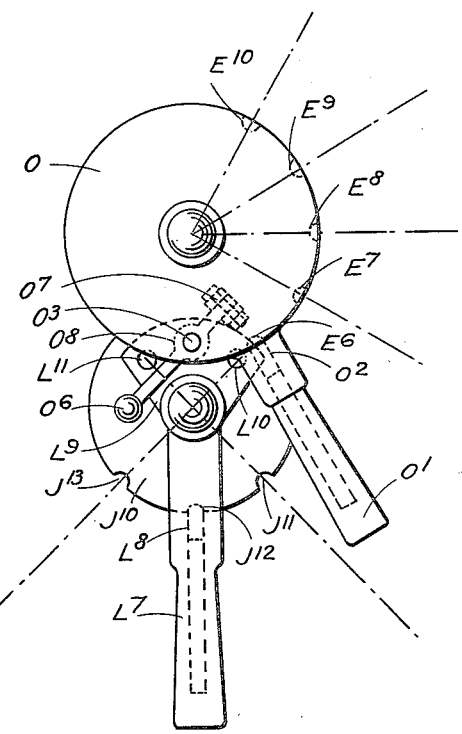
Figure 8:
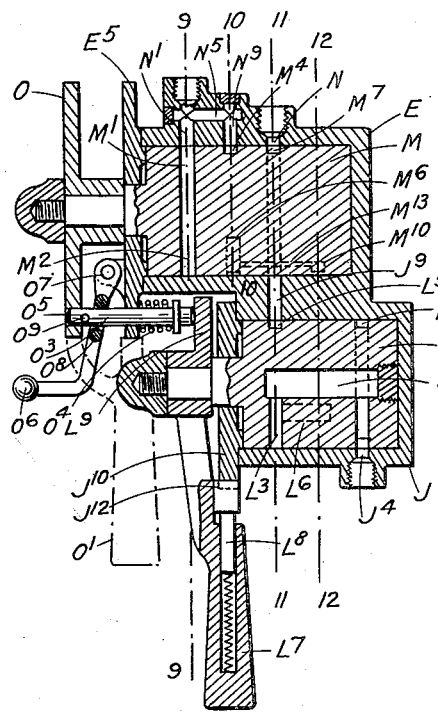

In these drawings,

Figures 1 and 2 are general diagrammatic views of two alternative arrangements of a fluid pressure control system for an internal combustion engine locomotive, Figures 3 and 4 are sections on the lines 3—3 and 4—4 of a part of Figure 2, Figure 5 is a diagrammatic view of an epicyclic variable speed gear controlled by the fluid pressure system, Figure 6 is a diagrammatic view partly in section on the line 6—6 of a portion of Figure 1, Figures 7 and 8 are respectively a plan and a longitudinal section of one of the devices shown in Figure 1, Figures 9–12 are parallel sections on the lines 9—9, 10—10, 11—11 and 12—12 respectively of Figure 8, Figure 13 shows on a larger scale one of the devices shown in Figure 2, and Figures 14–20 are enlarged views of another of the devices shown in Figure 1, Figures 15–18 being parallel sections on the lines 15—15, 16—16, 17—17, and 18—18 respectively of Figure 14.

The fluid pressure system illustrated in the drawings is more particularly intended for the control of the transmission mechanism of an internal combustion engine locomotive, in which power from an internal combustion engine of the heavy oil type is transmitted through an epicyclic variable speed gear (of one or other of the types described in the present applicant's prior application for Letters Patent of the United States of America Serial No. 724,719) and through a bevel reversing mechanism (such for example as is described in the present applicant's application for Letters Patent of the United States of America Serial No. 749,500) to a set of coupled track wheels.

The two alternative arrangements of the control system illustrated in Figures 1 and 2 differ chiefly in respect of the mechanical construction of the various devices employed and the main features of the control system are common to both arrangements. These main features comprise:—

(1) A pump for delivering fluid under pressure to the control system.

(2) A hand-operated distributing valve selectively controlling passages through which the fluid is supplied for actuating the clutches of the epicyclic gear.

(3) Means for controlling the supply of pressure fluid to the distributing valve automatically either in accordance with the road speed of the locomotive or in accordance jointly with the road speed and the engine speed.

(4) A device for operating the reversing mechanism by hand either directly or through the medium of the fluid pressure system.

(5) Fluid pressure operated mechanism for locking the operating device for the reversing mechanism.

(6) Means for releasing such locking mechanism when the locomotive comes to rest.

(7) A fluid pressure interlock between the operating device for the reversing mechanism and the operating device for the locomotive brakes.

In some cases Figures 1 and 2 show alternative constructions for these main devices, and it will be understood that in such cases a device shown in Figure 1 may be substituted for the corresponding device shown in Figure 2 and vice versa. The same reference letters will be employed in Figures 1 and 2 where applicable.

In the arrangement shown in Figure 1, a reciprocating pump $A$ draws fluid from a supply tank $A'$ through a pipe $A^2$ and a suction valve $A^3$ and delivers it under pressure past a delivery valve $A^4$ into a pipe $A^5$, leading into a cylinder $A^6$, which forms part of a pressure regulating device. Within this cylinder $A^6$ is a spring-controlled piston $A^7$ which acts on a rod $A^8$ connected to the suction valve $A^3$. If the fluid pressure in the pipe $A^5$ exceeds a predetermined value dependent upon the tension of the springs controlling the piston $A^7$, this piston will rise in its cylinder and will open the suction valve $A^3$. So long as the valve $A^3$ is held open no fluid will be delivered through the valve $A^4$ and the pressure in the pipe $A^5$ will fall again, thus causing the piston $A^7$ to return to its normal position and allow the suction valve $A^3$ to close.

From the cylinder $A^6$ the fluid is supplied under pressure through a pipe $A^9$ to an internal passage $B'$ in a rotary valve $B$ rotatable within a casing $B^2$. The rotary valve $B$ is provided with a recess $B^3$ extending part of the way round the valve, and the passage $B'$ and the recess $B^3$ cooperate with ports $B^4$ $B^5$ $B^6$ in the casing $B^2$. The valve $B$ carries a toothed sector $B^7$ engaging with a toothed rack $B^8$ connected to a piston $B^9$ which can move in a cylinder $B^{10}$. The rack $B^8$ is also connected to some part of the mechanism (not shown) for actuating the locomotive brakes and occupies the position shown in Figure 1 when the brakes are applied. In this position the pressure fluid is supplied through the passage $B'$ to the port $B^5$, whilst the port $B^4$ is connected through the recess $B^3$ to the relief port $B^6$. When the brakes are released, the rack $B^8$ moves to its uppermost position and rotates the valve $B$ until the fluid pressure supply passage $B'$ registers with the port $B^4$, whilst the port $B^5$ is opened to the relief port $B^6$ through the recess $B^3$. The port $B^4$ is in communication with a pipe $B^{11}$ through which pressure fluid passes to the gear, and consequently the recess $B^3$ serves to relieve the pressure of the fluid supplied to the gear when the brakes are applied.

The pipe $B^{11}$ leads to a port $C^5$ in the casing $C$ of an automatic device for controlling the supply of fluid to the gear in accordance jointly with the road speed of the locomotive and the engine speed. This device is shown in detail in Figures 14–20 and will be described later with reference to those figures. As an alternative to this device another automatic device shown in the corresponding position in Figure 2 may be employed. This alternative device is actuated in accordance only with the road speed of the locomotive. The device shown in Figure 1 allows the pressure fluid to pass through one or other of four ports $C'$ $C^2$ $C^3$ $C^4$ in the casing $C$ according to the relation between the engine speed and the road speed, these four ports corresponding to the four gear ratios of the variable speed gear. These four ports $C'$ $C^2$ $C^3$ $C^4$ communicate respectively with four pipes $D'$ $D^2$ $D^3$ $D^4$ leading to ports $E'$ $E^2$ $E^3$ $E^4$ in the casing $E$ of a distributing valve. The detail construction of the distributing valve is shown in Figures 7–12.

The port $B^5$ communicates with a pipe $B^{12}$ leading to an internal passage $F'$ in a member $F$ forming part of a device which prevents the flow of fluid through this pipe except when the locomotive is at rest. The member $F$ is rotated by suitable means at a speed corresponding to the road speed of the locomotive, and is disposed within a rotating sleeve $F^2$ provided with a port $F^3$ registering with the port $F'$ when the member $F$ and the sleeve $F^2$ are at rest. The member $F$ carries a disc $F^4$ and the sleeve $F^2$ a flywheel $F^5$, springs $F^6$ being interposed between the disc and the flywheel so as to form a spring driving connection between the member $F$ and the sleeve $F^2$. The disc $F^4$ carries centrifugal weights $F^7$ which are forced outwards as the member $F$ rotates until they come into clutching engagement with the inner surface of the flywheel $F^5$. The port $F^3$ is in communication with an annular passage $F^8$ within a fixed casing $F^9$ from which leads a pipe $F^{10}$. Thus when the locomotive is at rest the springs $F^6$ hold the parts in their normal positions in which the ports $F'$ $F^3$ register with one another so that pressure fluid can be supplied from the pipe $B^{12}$ into the pipe $F^{10}$. When the locomotive begins to move the member $F$ rotates and in turn drives the sleeve $F^2$, but owing to the inertia of the flywheel $F^5$ the sleeve $F^2$ lags behind the member $F$ to an extent sufficient to bring the ports $F'$ $F^3$ out of register and thereby to cut off communication between the pipes $B^{12}$ and $F^{10}$. So long as the locomotive is being accelerated the sleeve $F^2$ lags behind the member $F$ and when the speed reaches a predetermined limit the centrifugal weights $F^7$ clutch the disc $F^4$ to the flywheel $F^5$ and prevent further relative rotation between the member $F$ and the sleeve $F^2$. Communication between the pipes $B^{12}$ and $F^{10}$ will therefore be cut off until the speed falls again sufficiently to release the centrifugal clutch. When this occurs the deceleration will cause the sleeve $F^2$ to move relatively to the member $F$ to the other side of the zero position owing to the momentum of the flywheel $F^5$ and throughout the deceleration the member F will lag behind the sleeve $F^2$, until the locomotive comes to rest, when the springs $F^6$ will again bring the ports $F'$ $F^3$ into register and thus establish communication between the pipes $B^{12}$ and $F^{10}$. Other arrangements may be employed for this purpose and one alternative which is shown by way of example in Figure 2 will be described later with reference to that figure.

The pipe $F^{10}$ leads to a locking device for the reversing mechanism. The reversing mechanism, which is only illustrated diagrammatically in the drawings, comprises a driving bevel wheel G connected to the driven shaft of the epicyclic gear, and two driven bevel wheels $G'$ $G^2$ one or other of which can be moved into engagement with the driving bevel wheel G by means of a crank lever $G^3$ pivoted at $G^4$. This lever $G^3$ is actuated by means of a rod $G^5$ carrying a piston valve $G^6$ moving in a cylinder $G^7$. The rod $G^5$ has three holes $G^8$ $G^9$ $G^{10}$ adapted to receive a pin H. These three holes correspond to the three positions of the reversing mechanism. Thus when the pin H is in the hole $G^8$ the reversing mechanism is in its forward drive position, when the pin is in the hole $G^9$ the reversing mechanism is in the neutral position (as shown), and when the pin is in the hole $G^{10}$ the mechanism is in the reverse drive position. The pin H is connected to a piston $H'$ which moves in a cylinder $H^2$ under the combined actions of a spring $H^3$ and the fluid pressure in a chamber $H^4$ into which the pipe $F^{10}$ leads. The chamber $H^4$ communicates through a segmental port $H^5$ (see Figure 6) in the wall of the cylinder $G^7$ with one or other of three internal passages $G^{11}$ $G^{12}$ $G^{13}$ in the piston $G^6$ according to the position of this piston. The other ends of these three passages register respectively with ports in the wall of the cylinder communicating with pipes $H^6$ $H^7$ $H^8$. Thus when fluid is forced through the passage $F^{10}$, it enters the chamber $H^4$, which is in communication with one or other of the pipes $H^6$ $H^7$ $H^8$, and if the other end of this pipe is closed the fluid will raise the piston $H'$ in the cylinder $H^2$ thereby withdrawing the pin H from the hole $G^8$ or $G^9$ or $G^{10}$ with which it is in engagement. The raising of the piston $H'$ opens communication between the chamber $H^4$ and a pipe $H^9$ and the fluid is forced through this pipe. When the piston $H'$ is in its lowermost position as shown the pipe $H^9$ is in communication through an internal passage $H^{10}$ in the piston with a relief passage $H^{11}$. This pipe $H^9$ supplies fluid under pressure on the one hand to a pipe $H^{12}$ for the actuation of the operating mechanism for the reversing mechanism and on the other hand to a pipe $H^{13}$ which leads to the cylinder $B^{10}$. Thus so long as pressure fluid is being supplied to the pipe $H^{13}$ to operate the reversing mechanism, the piston $B^9$ is held in its lowermost position in the cylinder $B^{10}$. This prevents the locomotive brakes from being released until the pressure in the pipe $H^9$ is relieved and, as will be shown later, this pressure is not relieved until the reversing mechanism has been fully operated.

It will be seen that owing to the pin H the reversing mechanism cannot be operated until fluid under pressure is allowed to pass into the pipe $F^{10}$ (i. e. until the brakes are applied and the locomotive has come to rest) and not even then unless the pipe $H^6$ or $H^7$ or $H^8$, which happens to be in operation, is closed at its other end. The three pipes $H^6$ $H^7$ $H^8$ lead to ports $J'$ $J^2$ $J^3$ (Figure 6) in the casing J of a reversing valve which is arranged together with the distributing valve to form a single unit, shown in detail in Figures 7-12. The casing J of the reversing valve is provided with five other ports $J^4$ $J^5$ $J^6$ $J^7$ $J^8$, of which the first connects with the inlet pipe $H^{12}$ whilst the other four connect respectively with outlet pipes $K^5$ $K^6$ $K^7$ $K^8$. The pipes $K^5$ $K^7$ lead respectively to the two ends of a cylinder K containing a piston $K'$, and the pipes $K^6$ $K^8$ lead to the two ends of a second cylinder $K^2$ containing a piston $K^3$. The connecting rods of the two pistons $K'$ $K^3$ are pivoted to the ends of a floating lever $K^4$, which is pivoted at its mid-point to the rod $G^5$. These pistons $K'$ $K^3$ and the lever $K^4$ constitute the operating mechanism for the bevel reversing mechanism G $G'$ $G^2$.

Figure 9:
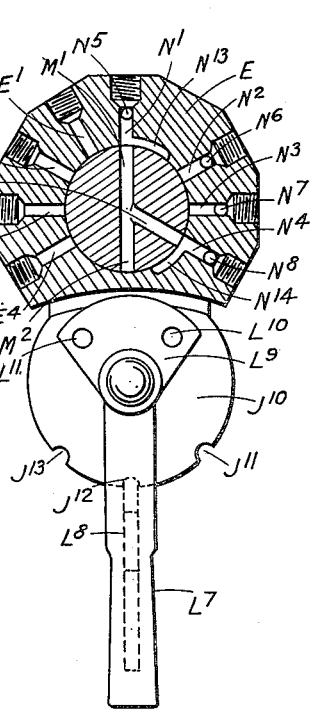
Figures 10, 11, 12:
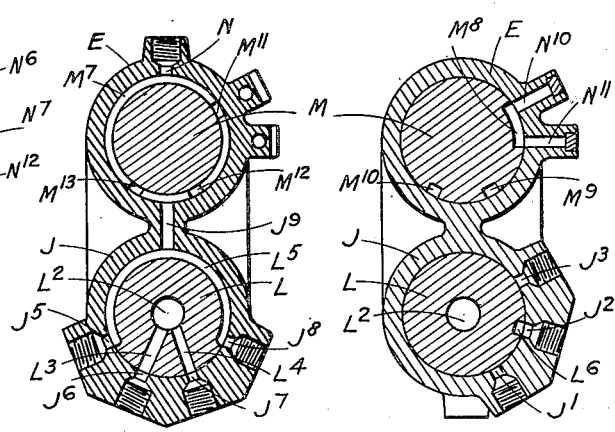

The combined distributing and reversing valves illustrated in detail in Figures 7-12 will now be described. The reversing valve comprises a casing J within which a rotary valve member L is mounted. This valve member L is provided with internal passages and recesses in three parallel planes, sections through two of which are shown respectively in Figures 11 and 12. In the third plane the member L is provided with an annular recess $L'$ registering with the inlet port $J^4$ through which the pressure fluid is supplied through the pipe $H^{12}$. This recess $L'$ is permanently in communication with a central passage $L^2$, from which radiate in the plane of Figure 11 two passages $L^3$ $L^4$. In the same plane the valve member L has a recess $L^5$ which extends over part of its circumference, and this recess and the two passages $L^3$ $L^4$ register with the ports $J^5$ $J^6$ $J^7$ $J^8$ communicating with the operating pistons $K'$ $K^3$ for the reversing mechanism. From the recess $L^5$ a further recess $L^6$ extends longitudinally into the plane of Figure 12 in such a position that it registers with one or other of the ports $J'$ $J^2$ $J^3$. The recess $L^5$ is also permanently in communication with a passage $J^9$ through that part of the casing J E which separates the reversing valve from the distributing valve, this passage $J^9$ being always open to a relief passage as will be explained later. The relative positions of the ports and passages in the planes of Figures 11 and 12 are such that in the forward drive position the passages $L^3$ $L^4$ register with the ports $J^7$ $J^8$ and the recess $L^6$ with the port $J^3$. Thus the fluid supply pipe $H^{12}$ is in communication with the pipes $K^7$ $K^8$ and the pipe $H^8$ is open to relief. In the neutral position (as shown) the pipe $H^{12}$ is in communication through the passages $L^3$ $L^4$ and the ports $J^6$ $J^7$ with the pipes $K^6$ $K^7$ and the pipe $H^7$ is open to relief. In the reverse drive position the pipe $H^{12}$ communicates through the passages $L^3$ $L^4$ and the ports $J^5$ $J^6$ with the pipes $K^5$ $K^6$ and the pipe $H^6$ is open to relief.

The valve member L projects through a fixed cover plate $J^{10}$ and carries at its end a reversing hand lever $L^7$ by means of which the member L is rotated. This lever is provided with a spring-controlled detent $L^8$ which engages in one or other of the notches $J^{11}$ $J^{12}$ $J^{13}$ in the edge of the cover plate $J^{10}$ according to whether the valve member is in its forward drive position, its neutral position or its reverse drive position. The valve member L also carries on the side opposite to the hand lever $L^7$ a flat plate $L^9$ having two holes $L^{10}$ $L^{11}$. These holes are provided for the purpose of interlocking the reversing lever with the gear lever as will be described later.

The distributing valve comprises a casing E within which is mounted a rotary valve member M. The valve member M and the casing E are provided with a number of passages and ports arranged in four parallel planes, sections through these planes being shown respectively in Figures 9, 10, 11 and 12. In the plane of Figure 9 the casing E contains in addition to the four ports $E'$ $E^2$ $E^3$ $E^4$ above referred to four other ports $N'$ $N^2$ $N^3$ $N^4$ through which the pressure fluid is supplied respectively to actuate the four plate clutches of the epicyclic gear (to be described later). From the four ports $N'$ $N^2$ $N^3$ $N^4$ longitudinal passages $N^5$ $N^6$ $N^7$ $N^8$ lead to four more ports $N^9$ $N^{10}$ $N^{11}$ $N^{12}$, of which two $N^9$ $N^{12}$ are in the plane of Figure 10 and two $N^{10}$ $N^{11}$ are in the plane of Figure 12. In the plane of Figure 11 a relief port N is provided. The two ports $N'$ $N^4$ are extended laterally in the plane of Figure 9 as shown respectively at $N^{13}$ and at $N^{14}$.

The rotary valve member M is provided in the plane of Figure 9 with three radial passages $M'$ $M^2$ $M^3$, of which the first $M'$ is adapted to register with one or other of the ports $N'$ $E'$ $E^2$ $E^3$ $E^4$, whilst the passages $M^2$ $M^3$ register selectively with the ports $N'$ $N^2$ $N^3$ $N^4$ (or with the extensions $N^{13}$, $N^{14}$ of the ports $N^1$, $N^4$) according to the position of the valve member. The valve member M is also provided with three recesses $M^4$ $M^5$ $M^6$ in the plane of Figure 10, a completely annular recess $M^7$ in the plane of Figure 11, and three more recesses $M^8$ $M^9$ $M^{10}$ in the plane of Figure 12. The annular recess $M^7$ is always in communication with the relief port N and also with the passage $J^9$, so that the port N serves as a relief port both for the distributing valve and for the reversing valve. The two recesses $M^4$ and $M^8$ are connected together and to the annular recess $M^7$ by means of a longitudinal recess $M^{11}$, and similar longitudinal recesses $M^{12}$ and $M^{13}$ also connect the recesses $M^5$ $M^9$ and $M^6$ $M^{10}$ respectively with the annular recess $M^7$, so that all the recesses in the valve member M are permanently in communication with the relief port N.

In the neutral position (as shown) the passage $M'$ does not register with any of the pressure fluid supply ports $E'$ $E^2$ $E^3$ $E^4$ and the four delivery ports $N'$ $N^2$ $N^3$ $N^4$ are open to relief respectively through the passages $N^5$ $N^9$ $M^4$ $M^{11}$ $M^7$ N, $N^6$ $N^{10}$ $M^8$ $M^{11}$ $M^7$ N, $N^7$ $N^{11}$ $M^8$ $M^{11}$ $M^7$ N, $N^8$ $N^{12}$ $M^5$ $M^{12}$ $M^7$ N. When the valve member M is rotated one step counter-clockwise (in Figure 9), the passages come into a position corresponding to the first speed of the gear. The supply port $E'$ is connected through the passages $M'$ $M^2$ $M^3$ with the delivery ports $N^3$ $N^4$, the connections from these ports to the relief port N being broken, whilst the ports $N'$ $N^2$ are still open to relief. In the second speed position the supply port $E^2$ is connected to the delivery ports $N^2$ $N^4$, the port $N'$ being still open to relief, whilst the port $N^3$ is opened to relief by the recess $M^9$ coming into register with the port $N^{11}$. In the third speed position the port $E^3$ is connected to the ports $N'$ $N^3$, and the ports $N^2$ $N^4$ are respectively connected to relief by means of the recesses $M^9$ and $M^6$. In the direct drive position the port $E^4$ is connected to the ports $N'$ $N^2$, the ports $N^3$ $N^4$ being open to relief through the recesses $M^{10}$ and $M^6$.

The valve member M projects through a fixed cover plate $E^5$ on the end of the casing E and carries a disc O on which is mounted a hand lever $O'$. This gear lever $O'$ carries a spring-pressed detent indicated at $O^2$ and arranged in a manner similar to the detent $L^8$ in the reversing lever, this detent $O^2$ engaging in one or other of five notches $E^6$ $E^7$ $E^8$ $E^9$ $E^{10}$ in the edge of the cover plate $E^5$ and thereby holding the member M securely in its five operative positions as described above.

A mechanical interlock is provided between the gear lever $O'$ and the reversing lever $L^7$. This consists of a pin $O^3$ passing through a hole in the cover plate $E^5$ and pressed by a spring $O^4$ towards the plate $L^9$ carried by the reversing lever. This pin $O^3$ is in such a position that when the reversing lever $L^7$ is moved into its forward drive position or its reverse drive position the spring $O^4$ will force the pin $O^3$ into the hole $L^{10}$ or the hole $L^{11}$, so that the lever will be locked in its position. The pin $O^3$ is of such a length that when it engages in one or other of the holes $L^{10}$ $L^{11}$, its upper end is just clear of the lower surface of the disc O, so that this disc is then free to be rotated. When, however, the pin $O^3$ is not in one of the holes $L^{10}$ $L^{11}$ its lower end rests on the surface of the plate $L^9$ and its upper end then projects into a hole $O^5$ in the disc O, thus locking the gear lever in position. The hole $O^5$ is so disposed that when locked the gear lever is in its neutral position. An additional hand lever $O^6$ is provided for the purpose of lifting the pin $O^3$ out of the hole $L^{10}$ (or $L^{11}$) when it is desired to operate the reversing lever $L^7$. This lever $O^6$ is pivoted at $O^7$ to the cover plate $E^5$ and carries a collar $O^8$ surrounding the pin $O^3$, this collar engaging with a small pin $O^9$ projecting from the interlocking pin $O^3$. It will be seen that this interlocking mechanism prevents the gear lever from being moved from its neutral position except when the reversing lever is in one or other of its two driving positions, and also prevents the reversing lever from being operated except when the gear lever is in its neutral position.

From the four delivery ports $N'$ $N^2$ $N^3$ $N^4$ respectively of the distributing valve lead four pipes $P'$ $P^2$ $P^3$ $P^4$ through which the pressure fluid is supplied for the actuation of the variable speed gear. This gear is preferably of one or other of the forms described in the prior U. S. application No. 724,719 above referred to, and one such construction is illustrated very diagrammatically in Figure 5. In the epicyclic gear shown in Figure 5, the driving shaft Q carries a sun wheel $Q'$ which cooperates with an annulus $Q^2$ through a set of planet pinions $Q^3$, these pinions being connected by means of a disc $Q^4$ with the annulus $Q^5$ of a second epicyclic gear train. This annulus $Q^5$ cooperates with a sun wheel $Q^6$ through planet pinions $Q^7$ carried by the driven shaft $Q^8$, from which the drive is taken through a spur wheel $Q^9$. The speed changes of the gear are controlled by means of four plate clutches $R'$ $R^2$ $R^3$ $R^4$, of which the first two $R'$ and $R^2$ serve to clutch the disc $Q^4$ respectively to the annulus $Q^2$ and to the planet pinions $Q^7$, whilst the other two $R^3$ and $R^4$ serve respectively to clutch the sun wheel $Q^6$ and the annulus $Q^2$ to the fixed casing R. The clutches are each actuated by means of a piston $R^5$ moving in a cylinder $R^6$ and pressed by a spring $R^7$ in a direction to disengage the clutch, the piston being forced inwardly to cause the clutch to engage by means of fluid under pressure admitted into the outer end of the cylinder from an annular chamber $R^8$. In the case of the clutches $R^3$ and $R^4$, in each of which one of the members is fixed, the annular chambers $R^8$ are disposed in the fixed member and the pipes $P^3$ and $P^4$ lead directly into these chambers. In each of the other two clutches $R'$ $R^2$, however, both members are rotating, and the two annular chambers are carried by the disc $Q^4$. The two supply pipes $P'$ $P^2$ for these clutches lead respectively into two annular passages $P^5$ $P^6$ in a box $P^7$ disposed adjacent to the end of the driven shaft $Q^8$. Within this box $P^7$ and extending through the driven shaft to the disc $Q^4$ are disposed two concentric pipes $P^8$ $P^9$, with the inner $P^8$ of which the annular passage $P^5$ communicates through a port $P^{10}$, whilst the passage $P^6$ communicates with the outer pipe $P^9$. At their other ends the two pipes $P^8$ $P^9$ communicate respectively with passages $P^{11}$ $P^{12}$ in the disc $Q^4$ and thence with the two annular chambers associated with the clutches $R'$ and $R^2$. Thus when fluid under pressure is admitted to one or other of the pipes $P'$ $P^2$ $P^3$ $P^4$, the corresponding clutches $R'$ $R^2$ $R^3 R^4$ are caused to engage. When fluid is supplied through the pipes $P'$ $P^2$ the clutches $R'$ $R^2$ will engage and a direct drive will be obtained. The third speed is obtained by admitting fluid through the pipes $P'$ $P^3$ so as to engage the clutches $R'$ $R^3$ and thereby to fix the sun wheel $Q^6$ whilst the epicyclic gear train $Q'$ $Q^2$ $Q^3$ rotates as a solid coupling. For second speed fluid is admitted through the pipes $P^2$ $P^4$ so that the clutch $R^4$ fixes the annulus $Q^2$ and the clutch $R^2$ causes the gear train $Q^5$ $Q^6$ $Q^7$ to rotate as a solid coupling. For first speed fluid admitted through the pipes $P^3$ $P^4$ causes the clutches $R^3$ $R^4$ to engage and thereby to fix the annulus $Q^2$ and the sun wheel $Q^6$. As has already been described the construction of the distributing valve is such that in each position pressure is relieved from those clutches not in use, whilst in the neutral position pressure is relieved from all four clutches.

Turning now to the arrangement shown in Figure 2, only those parts will be described which differ from the corresponding parts of Figure 1. The pressure fluid supply pump A $A'$ $A^2$ . . . $A^9$ is arranged exactly as in Figure 1 the same reference letters being employed. The pipe $A^9$ again leads to a rotary valve forming part of an interlock between the operating devices for the brakes and the reversing mechanism, but in this case the pipe $A^{10}$ (corresponding to $B^{11}$ in Figure 1) through which the pressure fluid passes to the variable speed gear is connected directly to the pipe $A^9$ instead of through the rotary valve. A further pipe $A^{11}$ also leads from the pipe $A^9$ for the purpose of controlling the pressure fluid supply to the gear. The pipes $A^{10}$ $A^{11}$ lead to ports $S^5$ $S^6$ in the casing S of a valve which acts to control the fluid supply to the gear automatically in accordance with the road speed of the locomotive. This valve, which is shown in detail in Figure 13, is an alternative to that shown in Figures 1 and 14–20, and either valve may be employed in either of the general arrangements. In Figure 2 the valve casing S is provided with four outlet ports $S'$ $S^2$ $S^3$ $S^4$ which communicate with the four pipes $D'$ $D^2$ $D^3$ $D^4$ leading to the distributing valve E M which is arranged in exactly the same manner as the distributing valve shown in Figures 1 and 7–12 except that it is not combined with a reversing valve.

The rotary valve and its associated piston and cylinder, which form part of the interlock between brakes and reverse and are indicated by the reference letters B B' . . . $B^{12}$, are similar to that shown in Figure 1 with the exception that the port $B^4$ and the pipe $B^{11}$ are no longer necessary.

The pipe $B^{12}$ leads as before to a device which prevents the flow of pressure fluid to the reversing mechanism when the locomotive is in motion. The device F F' . . . $F^{10}$, which is operated by means of a flywheel and a centrifugal clutch, may be employed in the arrangement of Figure 2, but this figure shows an alternative device which is operated by fluid pressure. This device consists of a reciprocating pump T driven in accordance with the road speed of the locomotive. The pump T draws fluid from the reservoir $A'$ through a pipe $T'$ and a suction valve $T^2$, and delivers it through a delivery valve $T^3$ into a chamber $T^4$ from which a by-pass passage $T^5$ leads back to the reservoir $A'$. The pressure set up in the chamber $T^4$ acts on a piston $T^6$ moving in a cylinder $T^7$ against the action of a spring $T^8$. The pipe $B^{12}$ leads to a port $T^9$ in the cylinder wall, this port being disposed opposite to an outlet port $T^{10}$ from which a pipe $T^{11}$ (corresponding to the pipe $F^{10}$ of Figure 1) leads to the reversing mechanism. The piston $T^6$ has an annular recess $T^{12}$ which registers with the two ports $T^9$ $T^{10}$ when the locomotive is at rest.

Thus as soon as the locomotive starts to move the pump T will deliver fluid under pressure into the chamber $T^4$, this pressure acting to raise the piston $T^6$ and cut off communication between the ports $T^9$ $T^{10}$. The fluid will leak slowly through the by-pass passage $T^5$, and as the locomotive speed increases the fluid will be forced at increasing velocity through this by-pass. The pressure of the spring $T^8$ and the cross-section of the by-pass passage $T^5$ are such that even very slow motion of the locomotive will be sufficient to raise the piston $T^6$ and close the ports $T^9$ $T^{10}$. When the locomotive road speed falls, the pressure in the chamber $T^4$ will also fall, until finally when the locomotive practically comes to rest the recess $T^{12}$ will open the ports $T^9$ $T^{10}$ and allow pressure fluid to flow into the pipe $T^{11}$.

The pipe $T^{11}$ leads to the operating device for the reversing mechanism. In the arrangement of Figure 2 the reversing mechanism is operated directly by hand instead of through a fluid pressure system. As in Figure 1 the reversing mechanism G $G'$ $G^2$ is operated by means of a crank lever $G^3$ pivoted at $G^4$ and a rod $G^5$ carrying a piston $G^6$ which moves in a cylinder $G^7$. Instead of being actuated by the fluid pressure operated lever $K^4$, the rod $G^5$ is now actuated directly by means of a hand wheel $G^{14}$ carrying a nut $G^{15}$ which is held against axial motion by a fixed bracket $G^{16}$ and engages with a screwthread $G^{17}$ on the end of the rod $G^5$, the piston $G^6$ being held against rotation by means of a key $G^{18}$ (see Figure 3). The rod $G^5$ is as before provided with three holes $G^8$ $G^9$ $G^{10}$ adapted to receive a pin H carried by a piston $H'$ which is moved in a cylinder $H^2$ against the action of a spring $H^3$ by the pressure in a chamber $H^4$ into which the pipe $T^{11}$ leads. Since the reversing valve J L is now dispensed with, it is unnecessary to provide the pipe $H^{12}$ and the pipe $H^{13}$ which leads to the cylinder $B^{10}$ is taken direct from the pipe $T^{11}$, the internal relief passage $H^{10}$ in the piston $H'$ being omitted.

The piston $G^6$ as before is provided with three internal passages $G^{11}$ $G^{12}$ $G^{13}$ (see Figure 3), one of which registers, when the piston is in the appropriate position, at one end with a recess $H^5$ communicating with the chamber $H^4$ and at the other end with the corresponding passage $H^6$ or $H^7$ or $H^8$, these passages in this construction being formed within the wall of the cylinder $G^7$. Since there is no reversing valve to control the passages $H^6$ $H^7$ $H^8$ as in the construction of Figure 1, it is necessary to provide a special valve for this purpose. This valve (see Figure 4) comprises a rotary plug $H^{14}$ which closes the end of the cylinder $G^7$ and forms a chamber $H^{15}$ therein surrounding the rod $G^5$, this chamber being permanently open to relief through a pipe $H^{16}$. The plug $H^{14}$ is rotated by means of a hand lever $H^{17}$ and contains an internal passage $H^{18}$, which opens at one end into the chamber $H^{15}$ and at the other end to one or other of the pipes $H^6$ $H^7$ $H^8$ according to the position of the hand lever.

Thus if the reversing mechanism is in its neutral position and the locomotive is at rest with the brakes applied, as shown, fluid under pressure is supplied through the pipe $T^{11}$ to the chamber $H^4$, but when the hand lever $H^{17}$ is in the position shown this chamber $H^4$ is open to relief through the passages $H^5$ $G^{12}$ $H^7$ $H^{13}$ $H^{15}$ $H^{16}$. If now it is desired to operate the reversing mechanism either to the forward drive or to the reverse drive position, the hand lever $H^{17}$ is moved one way or the other. This closes the pipe $H^7$ but opens one or other of the pipes $H^6$ $H^8$ to relief. The pressure in the chamber $H^4$ now raises the piston $H'$ and releases the pin $H$ out of the hole $G^9$. The hand wheel $G^{14}$ can now be rotated to operate the reversing mechanism, and as soon as the piston $G^6$ has moved into its new position the passage $G^{11}$ or $G^{13}$, as the case may be, opens communication between the chamber $H^4$ and the relief pipe $H^{16}$, so that the piston $H'$ falls and the locking pin $H$ enters the hole $G^8$ or $G^{10}$, the pressure at the same time being relieved in the cylinder $B^{10}$ thus enabling the brakes to be released.

There remain to be described the device shown in Figure 2 and illustrated in detail in Figure 13 whereby the supply of pressure fluid to the gear is controlled automatically in accordance with the road speed of the locomotive, and also the alternative device shown in Figure 1 and in Figures 14–20 whereby this control is effected in accordance jointly with the road speed and the engine speed. The former device will be described first.

The device illustrated in Figure 13 comprises a cylindrical valve casing $S$ to one end $S^8$ of which pressure fluid is supplied from the pipe $A^{10}$ (Figure 2) through the port $S^5$, whilst pressure fluid is also supplied from the pipe $A^{11}$ through the port $S^6$ to the other end $S^9$ of the cylinder, which is of larger diameter than the end $S^8$. The cylinder $S$ is also provided in its larger part $S^9$ with five other ports, through four of which $S'$ $S^2$ $S^3$ $S^4$ the pressure fluid is supplied respectively through the pipes $D'$ $D^2$ $D^3$ $D^4$ (Figure 2) for the control of the gear, whilst the fifth port $S^7$ is a relief port. Disposed within the two parts $S^8$ $S^9$ of the cylinder $S$ is a stepped piston $U$ having an internal passage $U'$ permanently in communication with the relief port $S^7$. The larger part of the piston $U$ is also provided with two annular recesses $U^2$ $U^3$, of which one $U^2$ communicates with the passage $U'$ whilst the other $U^3$ is open to the smaller end $S^8$ of the cylinder. The internal passage $U'$ communicates through an orifice $U^4$ with the larger end $S^9$ of the cylinder, this orifice being controlled by a pilot valve $U^5$, the stem $U^6$ of which is connected by a link $U^7$ to one arm of a crank lever $U^8$ pivoted at $U^9$. The other arm of the crank lever $U^8$ engages with the collar $U^{10}$ of a centrifugal governor $U^{11}$, the shaft $U^{12}$ of which is driven through a spur wheel $U^{13}$ in accordance with the road speed of the locomotive, by means for example of gearing driven from a non-driven road wheel.

Thus so long as the pilot valve $U^5$ keeps the orifice $U^4$ closed the piston $U$ will remain in its end position (as shown) owing to the differential action of the pressures in the two ends $S^8$ $S^9$ of the cylinder. In this position the pressure fluid can flow through the recess $U^3$ and the port $S'$ into the pipe $D'$, which corresponds to the first speed position of the gear. If now the road speed of the locomotive increases, the governor $U^{11}$ acts on the crank lever $U^8$ and withdraws the pilot valve $U^5$ a short distance. This opens the orifice $U^4$ and relieves the pressure in the larger part $S^9$ of the cylinder, so that the piston $U$ will move along the cylinder under the action of the pressure in the smaller end $S^8$ until the orifice $U^4$ is again closed or very nearly closed by the pilot valve $U^5$. A balance of pressures acting on the two sides of the piston $U$ will exist when the orifice $U^4$ is slightly open, the small leak through this orifice being just sufficient to counteract the normal difference of pressures on the two sides of the piston. Thus as the locomotive speed increases, the piston $U$ will follow the pilot valve $U^5$ and will open in turn the ports $S^2$, $S^3$, $S^4$ which correspond respectively to the second speed, third speed and direct drive positions of the gear, the three ports not open to the pressure fluid at any moment being in communication with the relief port $S^7$. A decrease in road speed will cause the pilot valve $U^5$ to close the orifice $U^4$ and the differential pressures will move the piston $U$ back again until a balance is restored.

As has been mentioned this device acts in conjunction with the distributing valve to control the supply of pressure fluid to the gear, and it will be seen that no pressure fluid is supplied to the gear unless the distributing valve is rotated into a position corresponding to that of the piston $U$. Thus when it is desired to start the locomotive from rest, the piston $U$ will be in its first speed position, and as soon as the gear lever is moved into its first speed position, the pressure fluid will flow through to the pipes $P^3$ $P^4$ and will cause the clutches $R^3$ and $R^4$ to engage thus bringing the gear into its first speed position. As the speed increases the piston $U$ will move along its cylinder towards its second speed position and when a predetermined speed is reached the operator must move the gear lever into the second speed position. This will allow the pressure fluid to flow through to the pipes $P^2$ $P^4$ to adjust the gear into its second speed position. Similar operation will bring the gear into its third speed and its direct drive positions. When it is desired to stop the locomotive, the reverse operations may be carried out, but it will usually be sufficient to move the gear lever straight over from its direct drive position to its neutral position. This will relieve the pressure on all the plate clutches and will cut the gear out without passing through the intermediate positions. It will be seen that this arrangement prevents the operator from putting in a gear ratio when the road speed of the locomotive is inappropriate for such a ratio.

The alternative device illustrated in Figures 14–20 is actuated partly in accordance with the road speed of the locomotive and partly in accordance with the engine speed, and is so arranged as to prevent the supply of pressure fluid for adjusting the gear into any gear ratio unless the engine speed and the road speed are in approximately the correct ratio to one another. This device comprises a cylindrical casing C within which are disposed two rotary valve members V W one within the other. The inner valve member W is rotated in accordance with the engine speed and the outer member V in accordance with the road speed of the locomotive by means of mechanisms to be described later. The casing C is provided with six ports $C'$ $C^2$ $C^3$ $C^4$ $C^5$ $C^6$, of which four $C'$ $C^2$ $C^3$ $C^4$ are outlet ports communicating respectively with the four pipes $D'$ $D^2$ $D^3$ $D^4$ (Figure 1) through which pressure fluid is supplied for the actuation of the gear, whilst the inlet port $C^5$ communicates with the pipe $B^{11}$, the port $C^6$ being connected to a relief pipe $C^7$. This port $C^6$ also communicates with the annular chamber $C^8$ which is formed within the cylinder C surrounding the inner valve member W beyond the end of the valve member V.

The two valve members V W are each provided with ports and recesses, most of which are arranged in four parallel planes passing respectively through the four outlet ports $C^4$ $C^3$ $C^2$ $C'$, sections on these planes being shown respectively in Figures 15–18. In the plane of Figure 18 the outer valve member V has a port $V'$ and a recess $V^5$, whilst the inner valve member W has a port $W'$, corresponding ports and recesses $V^2$ $V^6$ $W^2$ in the plane of Figure 17, $V^3$ $V^7$ $W^3$ in the plane of Figure 16, $V^4$ $V^8$ $W^4$ in the plane of Figure 15 also being provided. The four ports $W'$ $W^2$ $W^3$ $W^4$ all communicate with a longitudinal passage $W^5$, one end of which is connected through a passage $W^6$ with an annular recess $W^7$ registering with the inlet port $C^5$ in the casing C. The four recesses $V^5$ $V^6$ $V^7$ $V^8$ are also connected together in pairs by means of longitudinal recesses, the recesses $V^5$ and $V^6$ by the recess $V^9$, the recesses $V^6$ and $V^7$ by the recess $V^{10}$ and the recesses $V^7$ and $V^8$ by the recess $V^{11}$, the recess $V^{11}$ extending past the recess $V^8$ into the annular chamber $C^8$. The ports in the two valve members form part of the fluid pressure supply system to the gear, whilst the various recesses are used for relief purposes.

The valve member W carries at its end outside the casing C a bevel wheel $W^8$ which is actuated through mechanism now to be described by a worm $W^9$ and a shaft $W^{10}$ driven in accordance with the engine speed, as for example by gearing from the engine shaft. The valve member V carries at its end outside the casing C a spur wheel $V^{12}$ which engages with a toothed sector $V^{13}$ mounted on a shaft $V^{14}$ carrying a bevel wheel $V^{15}$. This bevel wheel $V^{15}$ is actuated through mechanism similar to that employed for actuating the bevel wheel $W^8$ by a worm $V^{16}$ on a shaft $V^{17}$ driven in accordance with the road speed of the locomotive, as for example by gearing from a non-driven road wheel. Figure 19 is a section at right angles to that of Figure 14 on a somewhat larger scale and shows the actuating mechanism for the bevel wheel $V^{15}$. The actuating mechanism for the bevel wheel $W^8$ is for the most part similar to that shown in Figure 19 and Figure 20 shows that part which differs from the actuating mechanism for the bevel wheel $V^{15}$.

Each actuating mechanism comprises a centrifugal governor X mounted on a shaft $X'$ which is driven through a gear wheel $X^2$ by a gear wheel $V^{18}$ or $W^{11}$ on the shaft $V^{17}$ or $W^{10}$ as the case may be. The governor collar $X^3$ is connected to a lever $X^4$ pivoted at $X^5$, to the remote end of which is pivoted a rod $X^6$. This rod $X^6$ is screwthreaded at its end $X^7$ and carries a "needle" $X^8$, which is adjustably held in position on the rod $X^6$ by means of nuts $X^9$ engaging with the screwthread $X^7$.

The worms $V^{16}$ $W^9$ also each drive through a worm wheel $X^{10}$ a shaft $X^{11}$ carrying an eccentric $X^{12}$ which reciprocates a plunger $X^{13}$. The connecting rod between the eccentric $X^{12}$ and the plunger $X^{13}$ is divided into two parts $X^{14}$ and $X^{15}$ oppositely screwthreaded, a double nut $X^{16}$ engaging with the two screwthreads, so that rotation of the nut varies the effective length of the connecting rod $X^{14}$ $X^{15}$. The plunger $X^{13}$ abuts against the head $X^{17}$ of the needle $X^8$.

In the case of the actuating mechanism for the bevel wheel $V^{15}$, the point $X^{18}$ of the needle $X^8$ engages with the notched front edges Y $Y'$ of the arms $Y^2$ $Y^3$ of two levers rotatably mounted on a spindle $Y^4$, the other arms $Y^5$ $Y^6$ of these levers carrying toothed sectors $Y^7$ $Y^8$ which engage with the bevel wheel $V^{15}$. The corresponding parts of the actuating mechanism for the bevel wheel $W^8$ are similarly arranged and are shown in Figure 20. In this case the point $X^{18}$ of the needle $X^8$ engages with the notched front edges $Z$ $Z'$ of the arms $Z^2$ $Z^3$ of two levers rotatably mounted on a spindle $Z^4$, the other arms $Z^5$ $Z^6$ of these levers carrying toothed sectors $Z^7$ $Z^8$ which engage with the bevel wheel $W^8$.

Each actuating mechanism operates in the following manner. When the speed increases the governor collar $X^3$ rises and the rod $X^6$ carrying the needle $X^8$ is depressed. During a backward stroke of the plunger $X^{13}$, the needle $X^8$ moves down over the front edge $Y$ (or $Z$) of the lever arm $Y^2$ (or $Z^2$), the subsequent forward stroke of the plunger $X^{13}$ forcing the point of the needle into a notch in this edge $Y$ (or $Z$) and thereby causing the lever $Y^2$ $Y^5$ (or $Z^2$ $Z^5$) to rotate about its pivot $Y^4$ (or $Z^4$). Owing to the fact that the two toothed sectors $Y^7$ $Y^8$ (or $Z^7$ $Z^8$) both engage with the same bevel wheel $V^{15}$ (or $W^8$), the two levers $Y^2$ $Y^5$ (or $Z^2$ $Z^5$) and $Y^3$ $Y^6$ (or $Z^3$ $Z^6$) rotate about the common spindle $Y^4$ (or $Z^4$) in opposite directions through the same angle, and consequently the needle point $X^{18}$ comes to rest in its new position in engagement with the two notched edges $Y$ $Y'$ (or $Z$ $Z'$), the bevel wheel $V^{15}$ (or $W^8$) having been rotated through an angle corresponding to the movement of the governor collar $X^3$. The actual law governing the relation between the movement of the governor collar $X^3$ and the angular movement of the bevel wheel $V^{15}$ (or $W^8$) depends upon the construction of the governor $X$, the lengths of the various lever arms and the disposition and shape of the two notched edges $Y$ $Y'$ (or $Z$ $Z'$), and these factors are so chosen as to give a law which suits the operation of the two rotary valve members $V$ $W$ now to be described.

The valves $V$ $W$ are shown in the drawings in the position they occupy when the locomotive is at rest and the engine is running light at its normal minimum speed. It will be noticed that in this position the port $V'$ registers with the port $W'$ and with the port $C'$, so that communication is established between the inlet pipe $C^5$ and the first speed outlet pipe $D'$. It should be mentioned that each of the ports $C'$ $C^2$ $C^3$ $C^4$ is of such a length as to cover the whole angular movement of the engine speed valve $W$ between the minimum and maximum engine speeds, so that the ports $W'$ $W^2$ $W^3$ $W^4$ will always be opposite some part of the corresponding ports $C'$ $C^2$ $C^3$ $C^4$ while the engine is running between these limiting speeds.

If now the brakes are released and the reversing mechanism is in an operative driving position, the locomotive can be started by moving the gear lever $O'$ to its first speed position. Fluid under pressure will now flow through to the clutches $R^3$ $R^4$ and will adjust the gear into the first speed position. The locomotive will now begin to move (some slipping taking place between the plates of the clutches in engagement) and when its road speed reaches a predetermined value the collar of the road speed governor will start moving, thereby rotating the valve $W$. The speed at which the road speed governor begins to act must be such as to bear a ratio to the minimum engine speed corresponding to the gear ratio of the gear when in its first speed position. Moreover the plate clutches of the gear must be so arranged that complete engagement without slipping will take place at this time. Further increase in the road speed will only take place now if the engine speed is increased (by means for example of an accelerator pedal). The locomotive continues to run in first gear until the engine speed has been increased to its maximum value, the two valves $V$ $W$ rotating in synchronism during this period so that the ports $V'$ $W'$ remain in register with one another. When the engine maximum speed is reached, the port $V^2$ will have moved round into register with the port $C^2$. At this stage the locomotive is ready to be transferred into its second speed position.

The driver of the locomotive, if he wishes to change to second speed, will move his gear lever $O'$ into the second speed position as soon as the usual road speed indicator shows that the road speed has reached the value at which this change should be made. This movement of the gear lever relieves the pressure on the clutch $R^3$ by means of the relief passages in the distributing valve, and thereby cuts out the gear. The engine speed must now be decreased by the accelerator pedal, the road speed of the locomotive not changing materially during this decrease. As soon as the engine speed gets down to the value at which the port $W^2$ registers with the port $V^2$, pressure fluid is supplied to the clutches $R^2$ $R^4$, thus bringing the gear into its second speed position. An increase in road speed can now be brought about by increasing the engine speed up to its maximum value, the two valves rotating in synchronism so as to keep the ports $V^2$ $W^2$ in register with one another. When the engine maximum speed is reached the port $V^3$ will have moved round into register with the port $C^3$. A change into third speed can now be effected in a similar manner by moving the gear lever $O'$ to the third speed position and then decreasing the engine speed until the ports $V^3$ $W^3$ register with one another. From third speed a similar change can be made into the direct drive position when the ports $V^4$ $W^4$ register with one another. For changing down from one speed to a lower speed the reverse process may be carried through, but when it is desired to stop the locomotive it will generally be sufficient for the driver to move the gear lever straight over from the direct drive position to the neutral position so that the intermediate gears will not be put in.

If the driver fails to operate his gear lever when the maximum engine speed is reached with any gear ratio, further movement of the two valves beyond the maximum speed position will cut off the supply of fluid to the gear since the end of the port $C'$ (or $C^2$ or $C^3$ or $C^4$) will be passed. The relief recess $V^5$ (or $V^6$ or $V^7$ or $V^8$) will then come into operation and relieve the pressure, so that the clutches in engagement will be released and the gear will be cut out. The resultant fall in speed will bring the ports into register again (if the valves move synchronously) and the same gear ratio will be put in again. These valves will thus act to prevent the engine running beyond the maximum speed whilst the locomotive is in gear, in addition to performing their main function of preventing any gear ratio from being put in unless the engine speed bears the correct ratio to the locomotive road speed.

Throughout the description various pipes have been referred to as relief pipes, as for example the pipes $B^6$ $C^7$ $H^{11}$ $H^{16}$ $N$ $S^7$. These pipes are shown in the drawings as open-ended pipes, but it will be understood that they are all connected to a pipe $A^{12}$ leading into the fluid supply reservoir $A'$. The whole fluid pressure system is thus a closed circuit system.

The detailed constructions of the various devices and the general arrangement of the system have been described by way of example only and modifications may be made without departing from the scope of the invention.

What I claim as my invention and desire to secure by Letters Patent is:—

1. In an internal combustion engine locomotive, the combination of a variable speed gear, a fluid pressure system for controlling the gear ratio of the variable speed gear, and means whereby the fluid pressure system is controlled partly by hand and partly automatically in accordance with the road speed of the locomotive.

2. In an internal combustion engine locomotive, the combination of a variable speed gear, a fluid pressure system for controlling the gear ratio of the variable speed gear, means for controlling the fluid pressure system automatically in accordance with the road speed of the locomotive, a hand-operated gear lever, and means whereby a change of gear ratio cannot be effected except when the position of the gear lever and the road speed are appropriate to such change.

3. In an internal combustion engine locomotive, the combination of a variable speed gear, means for delivering fluid under pressure to the gear for controlling the gear ratio thereof, a governor driven in accordance with the road speed of the locomotive, a control valve for the fluid pressure system actuated by the governor, a hand-operated gear lever, and means whereby the pressure fluid is allowed to pass to the gear only when the control valve and the gear lever are in corresponding positions.

4. In an internal combustion engine locomotive, the combination of a variable speed gear, fluid pressure operated devices for controlling the gear ratio thereof, means for delivering fluid under pressure through a system of passages leading to such devices, means actuated in accordance with the road speed of the locomotive for selectively controlling the fluid pressure passages, and a hand-operated distributing valve independently controlling the fluid pressure system.

5. In an internal combustion engine locomotive, the combination of a variable speed gear, a fluid pressure system for controlling the gear ratio thereof, a governor driven in accordance with the road speed of the locomotive, a control valve actuated by the governor, and a hand-operated distributing valve which operates in conjunction with the control valve to control the fluid pressure system.

6. In an internal combustion engine locomotive, the combination of a variable speed gear, a reversing mechanism, a fluid pressure system for controlling the gear and the reversing mechanism, and means whereby the supply of pressure fluid to the gear is controlled partly by hand and partly automatically in accordance with the road speed of the locomotive.

7. In an internal combustion engine locomotive, the combination of an epicyclic variable speed gear, a bevel reversing mechanism, a fluid pressure system for controlling the gear and the reversing mechanism, a hand-operated distributing valve controlling the supply of pressure fluid to the gear, and a hand-operated reversing valve controlling the supply of pressure fluid to the reversing mechanism.

8. In an internal combustion engine locomotive, the combination of a variable speed gear, a reversing mechanism, a fluid pressure system for controlling the gear and the reversing mechanism, means for controlling the supply of pressure fluid to the gear automatically in accordance with the road speed of the locomotive, a hand-operated distributing valve independently controlling the supply of pressure fluid to the gear, and a hand-operated reversing valve controlling the supply of pressure fluid to the reversing mechanism.

9. In an internal combustion engine locomotive, the combination of a variable speed gear, a reversing mechanism, fluid pressure operated devices for controlling the gear and the reversing mechanism, and means for interlocking the two controlling devices with one another whereby the reversing mechanism cannot be operated except when the gear is in its neutral position and the gear cannot be adjusted from its neutral position except when the reversing mechanism is in one or other of its operative positions.

10. In an internal combustion engine locomotive, the combination of a variable speed gear, a reversing mechanism, a fluid pressure system for controlling the gear and the reversing mechanism, a hand-operated distributing valve for controlling the supply of pressure fluid to the gear, a hand-operated reversing valve for controlling the supply of pressure to the reversing mechanism, and means for interlocking the distributing valve with the reversing valve.

11. In an internal combustion engine locomotive, the combination of a variable speed gear, a reversing mechanism, a hand-operated controlling device for the reversing mechanism, a fluid pressure system for controlling the gear, a hand-operated gear lever, means for controlling the fluid pressure system partly by means of the gear lever and partly automatically in accordance with the road speed, and means for interlocking the gear lever with the controlling device for the reversing mechanism.

12. In an internal combustion engine locomotive, the combination of an epicyclic variable speed gear, a bevel reversing mechanism, a fluid pressure system for controlling the gear and the reversing mechanism, two rotary valves controlling the supply of pressure fluid to the gear and to the reversing mechanism respectively, a hand-lever for actuating each rotary valve, and a mechanical interlock between the two hand levers.

13. In an internal combustion engine locomotive, the combination of a variable speed gear, a reversing mechanism, a fluid pressure system for controlling the gear, a device for operating the reversing mechanism, and means associated with the locomotive brake-actuating mechanism whereby operation of the reversing mechanism is prevented except when the locomotive brakes are applied.

14. In an internal combustion engine locomotive, the combination of a variable speed gear, a reversing mechanism, a fluid pressure system for controlling the gear, a device for operating the reversing mechanism, and fluid pressure operated means for interlocking this device with the locomotive brake-actuating mechanism whereby the reversing mechanism can only be operated when the brakes are applied and the brakes cannot be released except when the reversing mechanism is in an operative driving position.

15. In an internal combustion engine locomotive, the combination of a variable speed gear, a reversing mechanism, a fluid pressure system for controlling the gear, means for controlling the fluid pressure system partly by hand and partly in accordance with the road speed of the locomotive, means for operating the reversing mechanism, a device for locking the reversing mechanism against operation, and means for preventing the release of this locking device except when the locomotive brakes are applied.

16. In an internal combustion engine locomotive, the combination of a variable speed gear, a reversing mechanism, a fluid pressure system for controlling the gear and the reversing mechanism, means for cutting off the supply of pressure fluid for operating the reversing mechanism except when the locomotive brakes are applied, and fluid pressure operated means for preventing the release of the locomotive brakes except when the reversing mechanism is in an operative driving position.

17. In an internal combustion engine locomotive, the combination of a variable speed gear, a reversing mechanism, a fluid pressure system for controlling the gear and the reversing mechanism, a hand-operated gear lever, means for controlling the supply of pressure fluid to the gear partly by means of the gear lever and partly automatically in accordance with the road speed of the locomotive a hand-operated reversing lever for controlling the supply of pressure fluid to the reversing mechanism, means for interlocking the gear lever with the reversing lever, and means for cutting off the supply of pressure fluid to the reversing mechanism except when the locomotive brakes are applied.

18. In an internal combustion engine locomotive, the combination with a variable speed gear, a reversing mechanism, a fluid pressure system for controlling the gear, means for operating the reversing mechanism, and means for locking the reversing mechanism against operation except when the locomotive is at rest.

19. In an internal combustion engine locomotive, the combination of a variable speed gear, a reversing mechanism, a fluid pressure system for controlling the gear, means for controlling the fluid pressure system partly by hand and partly automatically in accordance with the road speed, means for operating the reversing mechanism, and means for locking the reversing mechanism against operation when the locomotive is in motion.

20. In an internal combustion engine locomotive, the combination of a variable speed gear, a reversing mechanism, a fluid pressure system for controlling the gear and the reversing mechanism, a locking device for the reversing mechanism, and means operative when the locomotive is at rest for releasing the locking device and thereby allowing the reversing mechanism to be operated.

21. In an internal combustion engine locomotive, the combination of a variable speed gear, a reversing mechanism, fluid pressure operated controlling devices for the gear and the reversing mechanism, means for interlocking such controlling devices with one another, and means operated in accordance with the road speed of the locomotive whereby the reversing mechanism is locked against operation when the locomotive is in motion.

22. In an internal combustion engine locomotive, the combination of a variable speed gear, a reversing mechanism, a fluid pressure system for controlling the gear, means for operating the reversing mechanism, a locking device for the reversing mechanism, means operated in accordance with the road speed of the locomotive for releasing the locking device when the locomotive comes to rest and thereby allowing the reversing mechanism to be operated, and means for interlocking the reversing mechanism with the locomotive brake-actuating mechanism whereby the locomotive brakes cannot be released except when the reversing mechanism is in an operative driving position.

23. In an internal combustion engine locomotive, the combination of an internal combustion engine, a variable speed gear, a fluid pressure system for controlling the gear ratio thereof, hand-operated means for controlling the fluid pressure system, and a device for cutting off the supply of pressure fluid to the gear except when the engine speed and the road speed of the locomotive are in the correct ratio to one another.

24. In an internal combustion engine locomotive, the combination of an internal combustion engine, a variable speed gear, a fluid pressure system for controlling the gear ratio thereof, a hand-operated distributing valve selectively controlling the fluid pressure system, a governor driven in accordance with the engine speed, a governor driven in accordance with the road speed of the locomotive, and a device actuated by the two governors and adapted to cut off the supply of pressure fluid to the distributing valve except when the engine speed and the road speed of the locomotive are in the correct ratio to one another.

25. In an internal combustion engine locomotive, the combination of an internal combustion engine, a variable speed gear, a reversing mechanism, a fluid pressure system for controlling the gear, a hand-operated distributing valve controlling the fluid pressure system, a hand-operated device for operating the reversing mechanism, means for interlocking this device with the distributing valve, and means for cutting off the supply of pressure fluid to the distributing valve except when the engine speed and the road speed of the locomotive are in the correct ratio to one another.

In testimony whereof I have signed my name to this specification.

ALAN ERNEST LEOFRIC CHORLTON.